US012362452B2

(12) United States Patent
Chen et al.

(10) Patent No.: US 12,362,452 B2
(45) Date of Patent: Jul. 15, 2025

(54) 3 DB ORTHOGONAL HYBRID COUPLER, RADIO-FREQUENCY FRONT-END MODULE AND COMMUNICATION TERMINAL

(71) Applicant: VANCHIP (TIANJIN) TECHNOLOGY CO., LTD., Tianjin (CN)

(72) Inventors: Gang Chen, Tianjin (CN); Yunfang Bai, Tianjin (CN)

(73) Assignee: VANCHIP (TIANJIN) TECHNOLOGY CO., LTD., Tianjin (CN)

( * ) Notice: Subject to any disclaimer, the term of this patent is extended or adjusted under 35 U.S.C. 154(b) by 290 days.

(21) Appl. No.: 18/061,482

(22) Filed: Dec. 5, 2022

(65) Prior Publication Data

US 2023/0100717 A1 Mar. 30, 2023

Related U.S. Application Data

(63) Continuation of application No. PCT/CN2021/098457, filed on Jun. 4, 2021.

(30) Foreign Application Priority Data

Jun. 5, 2020 (CN) ........................ 202010503553.4

(51) Int. Cl.
*H01P 5/19* (2006.01)

(52) U.S. Cl.
CPC .................................... *H01P 5/19* (2013.01)

(58) Field of Classification Search
CPC .. H01P 5/19; H01P 5/187; H01P 5/185; H01P 5/16
USPC ........................................................ 333/117
See application file for complete search history.

(56) References Cited

U.S. PATENT DOCUMENTS 7,138,887 B2 * 11/2006 Podell ..................... H01P 5/187 333/112
8,525,614 B2 * 9/2013 Fujiwara .................. H01P 5/16 333/112
8,760,240 B2 * 6/2014 Yehezkely ............. H01F 5/003 336/200
(Continued)

FOREIGN PATENT DOCUMENTS

CN 108631036 A * 10/2018 ......... H01F 17/0006
RU 2693501 C1 * 7/2019 ................ H01P 5/18

*Primary Examiner* — Andrea Lindgren Baltzell
*Assistant Examiner* — Abigail Amir Yaldo
(74) *Attorney, Agent, or Firm* — George Guosheng Wang; Upstream Research and Patent LLC

(57) ABSTRACT

Disclosed are a 3 dB orthogonal hybrid coupler, a radio-frequency front-end module and a communication terminal. The 3 dB orthogonal hybrid coupler can be arranged on a substrate, and a straight-through metal coil and a coupling metal coil are of a laminated structure, a coplanar structure or a combined form of the laminated structure and the coplanar structure, such that a corresponding radio-frequency signal input port is connected to a first radio-frequency signal output port, and an isolation port is connected to a second radio-frequency signal output port. Moreover, according to the requirements of the operating frequency and the port feature impedance of the 3 dB orthogonal hybrid coupler, the number of turns and the number of layers of the straight-through metal coil and the coupling metal coil are adjusted.

6 Claims, 8 Drawing Sheets

(56) References Cited

U.S. PATENT DOCUMENTS

| | | | | |
|---|---|---|---|---|
| 9,093,734 | B2 * | 7/2015 | Gorbachov | H01P 5/184 |
| 9,123,982 | B2 * | 9/2015 | Ye | H01P 5/184 |
| 9,136,580 | B2 * | 9/2015 | Nakatani | H01L 23/5227 |
| 2018/0006352 | A1 * | 1/2018 | Issakov | G01R 33/365 |

* cited by examiner

3 DB ORTHOGONAL HYBRID COUPLER, RADIO-FREQUENCY FRONT-END MODULE AND COMMUNICATION TERMINAL

BACKGROUND

Technical Field

The present disclosure relates to a 3 dB orthogonal hybrid coupler, and also relates to a radio frequency front-end module including the 3 dB orthogonal hybrid coupler, and a corresponding communication terminal.

Related Art

A 3 dB orthogonal hybrid coupler is a commonly used four-port device, which can equally divide an input signal while maintaining high isolation between ports, and generate a 90° phase shift between two output signals, or combine two input signals with a phase difference of 90° while maintaining high isolation between ports.

As shown in FIG. 1, the 3 dB orthogonal hybrid coupler in the prior art includes two crossed quarter-wavelength transmission lines. Ideally, when a radio frequency (RF) signal input port inputs an RF signal, one half of the RF signal (equivalent to 3 dB) is directly connected to a port of RF signal output 1 (the phase of which is 0°), and the other half of the RF signal is coupled to a port of RF signal output 2 (the phase of which is 90°). Reflected energy generated by a mismatch of the ports of the 3 dB orthogonal hybrid coupler can be guided to flow into an isolation port or be offset at the RF signal input port, which can avoid a damage to driver equipment (a power unit).

The space of an RF front-end module used by 4G/5G and other mobile terminals is limited. To achieve better RF performance, the 3 dB orthogonal hybrid coupler is generally realized by a chip. However, due to a low Q value of a passive device on the chip, the 3 dB orthogonal hybrid coupler has a larger insertion loss. In addition, chips manufactured by some processes only provide a single layer or two layers of metal with different thicknesses, which causes impedance mismatch and poor isolation at the ports of the 3 dB orthogonal hybrid coupler. In addition, designing the 3 dB orthogonal hybrid coupler on the chip will occupy a large chip area, thus increasing the design cost of the RF front-end module.

SUMMARY

The first technical problem to be solved by the present disclosure is to provide a 3 dB orthogonal hybrid coupler realized on a base plate.

Another technical problem to be solved by the present disclosure is to provide an RF front-end module including the above-mentioned 3 dB orthogonal hybrid coupler, and a communication terminal.

In order to achieve the above objective, the present disclosure adopts the following technical solution:

According to a first aspect of an embodiment of the present disclosure, a 3 dB orthogonal hybrid coupler is provided. The 3 dB orthogonal hybrid coupler is arranged on a base plate, and includes an RF signal input port, a first RF signal output port, a second RF signal output port, an isolation port, straight-in metal coils connected between the RF signal input port and the first RF signal output port, and coupling metal coils connected between the isolation port and the second RF signal output port; the isolation port is connected to an isolation resistor to the ground;

when the RF signal input port inputs an RF input signal, the straight-in metal coils and the coupling metal coils are coupled by means of electromagnetic coupling and capacitive coupling; one half of the RF input signal flows to the first RF signal output port, and the other half of the RF input signal is coupled to the second RF signal output port; and a phase difference between two RF output signals is 90 degrees.

Preferably, when the straight-in metal coils and the coupling metal coils adopt a stacked structure, the straight-in metal coils and the coupling metal coils are subjected to capacitive coupling by means of metal coil surfaces.

Preferably, the straight-in metal oils and the coupling metal coils are staggered on the base plate.

Preferably, when the straight-in metal coils and the coupling metal coils adopt a coplanar structure, the straight-in metal coils and the coupling metal coils are subjected to capacitive coupling by means of metal coil edges.

Preferably, on the base plate, the straight-in metal coils and coupling metal coils of each layer are equally spaced in a staggered manner, and the straight-in metal coils and the coupling metal coils between adjacent layers have the same positions.

Preferably, when the straight-in metal coils and the coupling metal coils adopt a combined form of a stacked structure and a coplanar structure, the straight-in metal coils and the coupling metal coils are subjected to capacitive coupling by means of combination of metal coil surfaces and metal coil edges.

Preferably, on the base plate, the straight-in metal coils and coupling metal coils of each layer are equally spaced in a staggered manner, and the straight-in metal coils and the coupling metal coils between adjacent layers have opposite positions.

Preferably, connection relationships for the straight-in metal coils and the coupling metal coils between the various layers are as follows: one end of the coupling metal coil located on the first layer is connected with the first RF signal output port and is connected with one end of each of the coupling metal coils located on the odd layers through a fifth through hole respectively, and the other end of the coupling metal coil located on the first layer is connected with one end of each of the coupling metal coils located on the even layers and the other ends of the coupling metal coils located on the odd layers through a sixth through hole respectively; the other end of the coupling metal coil located on the second layer is connected with the other ends of the coupling metal coils located on the even layers through a seventh through hole respectively; the other end of the coupling metal coil located on the last layer is also connected with the isolation port;

one end of the straight-in metal coil located on the first layer is connected with the first RF signal output port, and is connected with one end of each of the straight-in metal coils located on the odd layers through an eighth through hole respectively; the other end of the straight-in metal coil located on the first layer is connected with one end of each of the straight-in metal coils located on the even layers and the other ends of the straight-in metal coils of the odd layers through a ninth through hole respectively; and the other end of the straight-in metal coil located on the second layer is connected with the RF signal input port, and is connected with the other ends of the straight-in metal coils located on the even layers through a tenth through hole respectively.

According to a second aspect of an embodiment of the present disclosure, an RF front-end module is provided. The RF front-end module includes the above-mentioned 3 dB orthogonal hybrid coupler.

According to a third aspect of an embodiment of the present disclosure, a communication terminal is provided. The communication terminal includes the above-mentioned 3 dB orthogonal hybrid coupler.

The 3 dB orthogonal hybrid coupler provided by the present disclosure can be realized on the base plate. To this end, the straight-in metal coils and the coupling metal coils adopt a stacked structure, a coplanar structure or the combined form of a stacked structure and a coplanar structure, so that the corresponding RF signal input port is connected with the first RF signal output port, the isolation port and the second RF signal output port. The number of turns and the number of layers of the straight-in metal coils and the number of turns and the number of layers of the coupling metal coils are adjusted according to a working frequency and a port characteristic impedance of the 3 dB orthogonal hybrid coupler, so as to reduce an insertion loss of the coupler, and optimize the RF performance of the 3 dB orthogonal hybrid coupler such as the port reflection coefficient and the port isolation degree. By use of the present disclosure, the chip area can be effectively saved, and the design cost of the RF front-end module is reduced.

DETAILED DESCRIPTION

Technical contents of the present disclosure are further described in detail below with reference to the accompanying drawings and specific embodiments.

Figure 4:
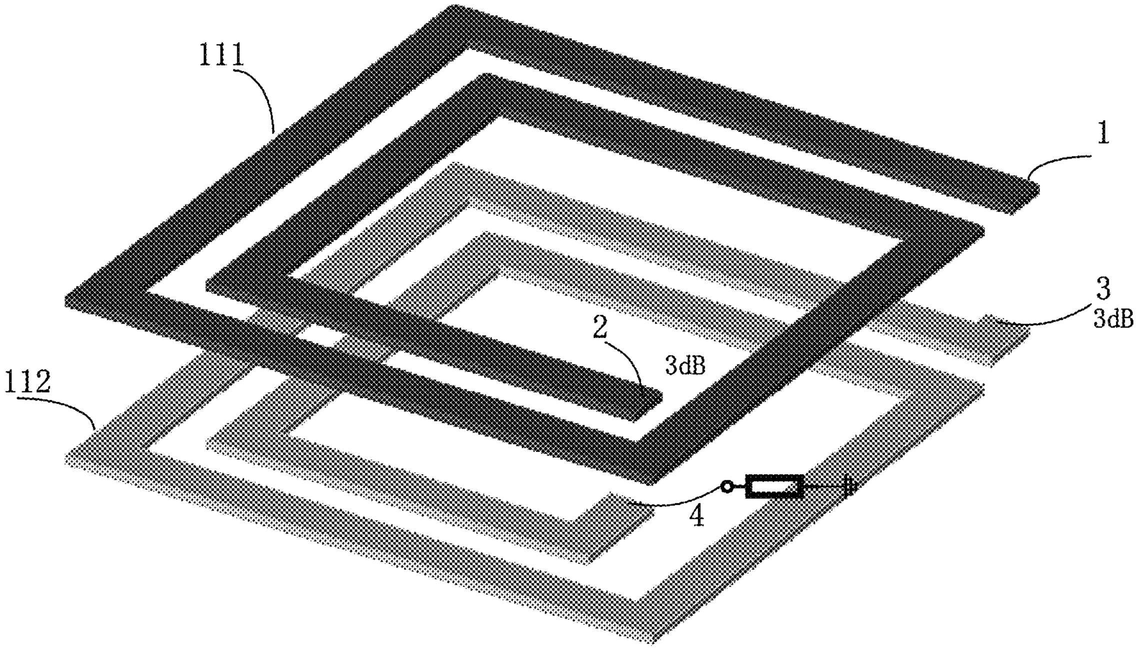
FIG. 4 is a schematic diagram of a stacked structure of a 3 dB orthogonal hybrid coupler provided by the present disclosure.
Figure 5:
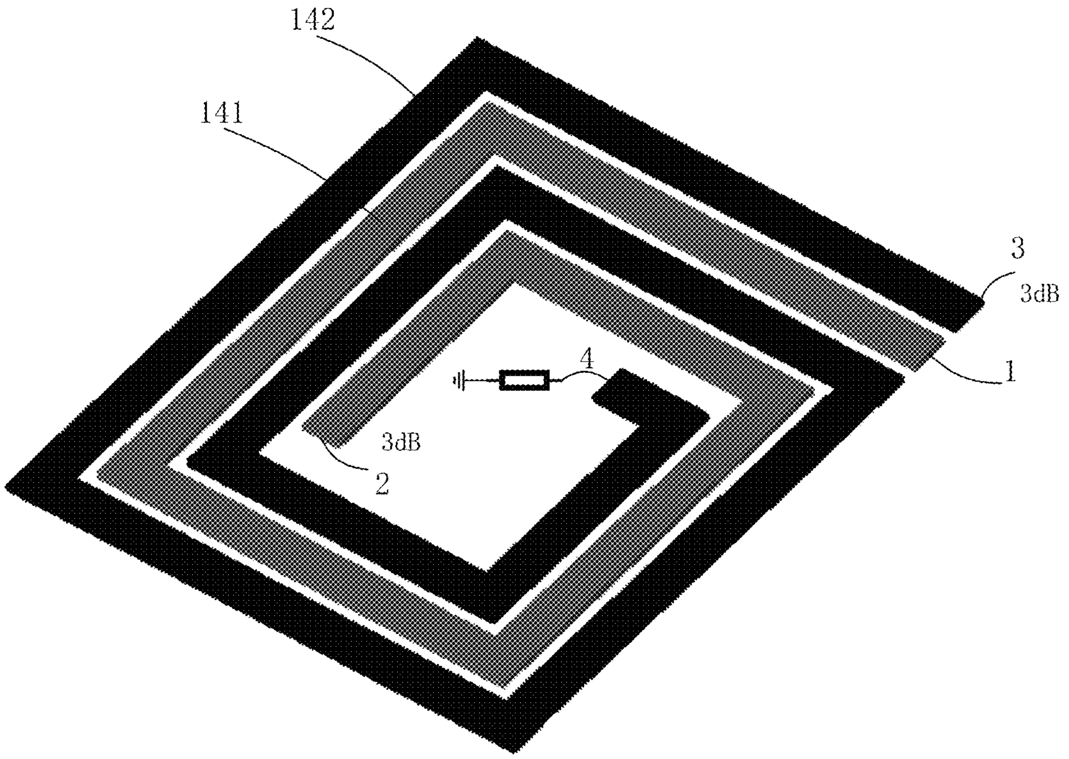
FIG. 5 is a schematic diagram of a coplanar structure of a single layer of metal coils in a 3 dB orthogonal hybrid coupler provided by the present disclosure.
Figure 6:
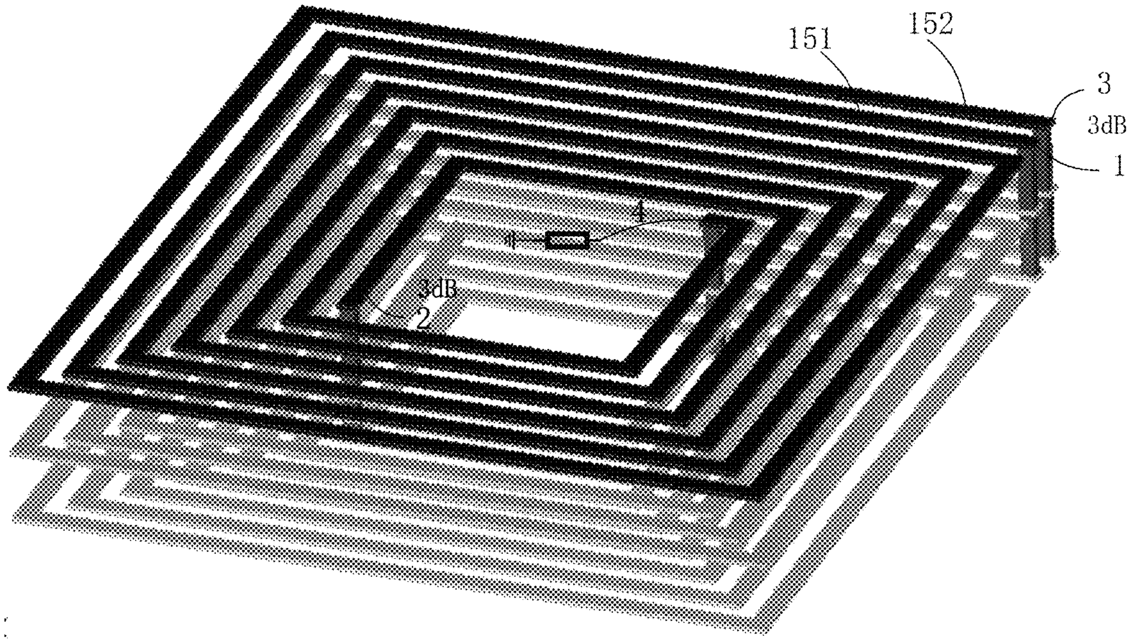
FIG. 6 is a schematic diagram of a coplanar structure of multiple layers of metal coils in a 3 dB orthogonal hybrid coupler provided by the present disclosure.

In order to effectively reduce the design cost of an RF front-end module, as shown in FIG. 4 to FIG. 6, the present disclosure provides a 3 dB orthogonal hybrid coupler that can be realized on a base plate. The 3 dB orthogonal hybrid coupler includes an RF signal input port 1, a first RF signal output port 2, a second RF signal output port 3, an isolation port 4, straight-in metal coils connected between the RF signal input port 1 and the first RF signal output port 2, and coupling metal coils connected between the isolation port 4 and the second RF signal output port 3. The isolation port 4 is connected to an isolation resistor to the ground.

When the RF signal input port 1 inputs an RF input signal, the straight-in metal coils and the coupling metal coils are coupled by means of electromagnetic coupling and capacitive coupling. One half of the RF input signal flows to the first RF signal output port 2, and the other half of the RF input signal is coupled to the second RF signal output port 3. A phase difference between two RF output signals is 90 degrees.

The straight-in metal coils connected between the RF signal input port 1 and the first RF signal output port 2 form an induction coil, and the coupling metal coils connected between the isolation port 4 and the second RF signal output port 3 form an induction coil. Electromagnetic coupling is performed using the inductance coil formed by the straight-in metal coils and the inductance coil formed by the coupling metal coils. In addition, the straight-in metal coils and the coupling metal coils are arranged on the base plate. The straight-in metal coils and the coupling metal coils can adopt a stacked structure, a coplanar structure, or a combined form of a stacked structure and a coplanar structure, so as to achieve capacitive coupling of the straight-in metal coils and the coupling metal coils by means of metal coil surfaces, metal coil edges, or combination of metal coil surfaces and metal coil edges.

Specifically, when the straight-in metal coils and the coupling metal coils adopt the stacked structure, the straight-in metal coils and the coupling metal coils are subjected to the capacitive coupling by means of the metal coil surfaces which are overlapping surfaces of the straight-in metal coils and the coupling metal coils. When the straight-in metal coils and the coupling metal coils adopt the coplanar structure, the straight-in metal coils and the coupling metal coils are subjected to the capacitive coupling by means of the metal coil edges which are edges of the straight-in metal coils and edges of the coupling metal coils adjacent to the straight-in metal coils. When the straight-in metal coils and the coupling metal coils adopt the combined form of the stacked structure and the coplanar structure, the straight-in metal coils and the coupling metal coils are subjected to the capacitive coupling by means of combination of the metal coil surfaces and the metal coil edges.

The straight-in metal coils and coupling metal coils can be single-turn or multi-turn metal coils enclosed by corresponding metal wires. The straight-in metal coils and the coupling metal coils have the same shapes. And it is better to use circular or square straight-in metal coils and coupling metal coils. In order to facilitate the understanding of the structure and principle of the 3 dB orthogonal hybrid coupler provided by the present disclosure, square straight-in metal coils and coupling metal coils are taken as an example. The stacked structure, the coplanar structure or the combined form of the stacked structure and the coplanar structure respectively used for the straight-in metal coils and the coupling metal coils are described in detail.

Embodiment 1

In the 3 dB orthogonal hybrid coupler provided by this embodiment, the straight-in metal coils and the coupling metal coils adopt the stacked structure. The straight-in metal coil of each layer has a similar length, and the coupling metal coil of each layer has a similar length. The number of layers and the number of turns of the straight-in metal coils and the number of layers and the number of turns of the coupling metal coils are the same. The straight-in metal coils and the coupling metal coils overlap, and a spacing between adjacent turns of the straight-in metal coils of each layer and a spacing between adjacent turns of the coupling metal coils of each layer are the same. In addition, on the base plate, the straight-in metal coils and the coupling metal coils are staggered from top to bottom. That is, on the base plate, from top to bottom, one layer of straight-in metal coils and one layer of coupling metal coils are staggered, or one layer of coupling metal coils and one layer of straight-in metal coils are staggered. The various layers of straight-in metal coils are connected through first through holes, and the various layers of coupling metal coils are connected through second through holes. The 3 dB orthogonal hybrid coupler provided by this embodiment is realized on the base plate, which solves the problem in the prior art that the design of the 3 dB orthogonal hybrid coupler on a chip occupies a large chip area, thereby increasing the design cost of the RF front-end module. In different embodiments of the present disclosure, the last layer of metal coil is a reference ground, the metal coil layers are ordered as being from top to bottom according to the distances, from far to near, from the metal coil layer where the reference ground is located.

In practical applications, reference data for designing an initial layout of the 3 dB orthogonal hybrid coupler on the base plate is preliminarily determined according to a working frequency band and a characteristic impedance for an output port of the 3 dB orthogonal hybrid coupler in combination with the following formula. The data is a coil width, height to ground, the number of layers, the number of turns and a spacing between coils of the straight-in metal coils and the coupling metal coils. After the initial layout of the 3 dB orthogonal hybrid coupler is designed on the base plate, the layout is input into simulation software to build a 3D electromagnetic simulation model. Then, whether the reference data for the designed initial layout of the 3 dB orthogonal hybrid coupler is accurate is verified, and the data referenced for the design of the layout of the 3 dB orthogonal hybrid coupler is adjusted according to a verification result; and new layouts of the 3 dB orthogonal hybrid coupler are continuously generated and input into the simulation software to build the 3D electromagnetic simulation model for verification until a metal wire characteristic impedance value and working frequency band output by the verification result realize that the working frequency band of the 3 dB orthogonal hybrid coupler is within a deigned frequency range as much as possible, so that the characteristic impedances of the first RF signal output port 2 and the second RF signal output port 3 are as consistent as possible, while making the impedances and isolation degrees of the various ports of the coupler meet design indicators. The following will describe in detail how to preliminarily determine the reference data for the design of the initial layout of the 3 dB orthogonal hybrid coupler on the base plate when the straight-in metal coils and the coupling metal coils adopt the stacked structure.

Figure 1:
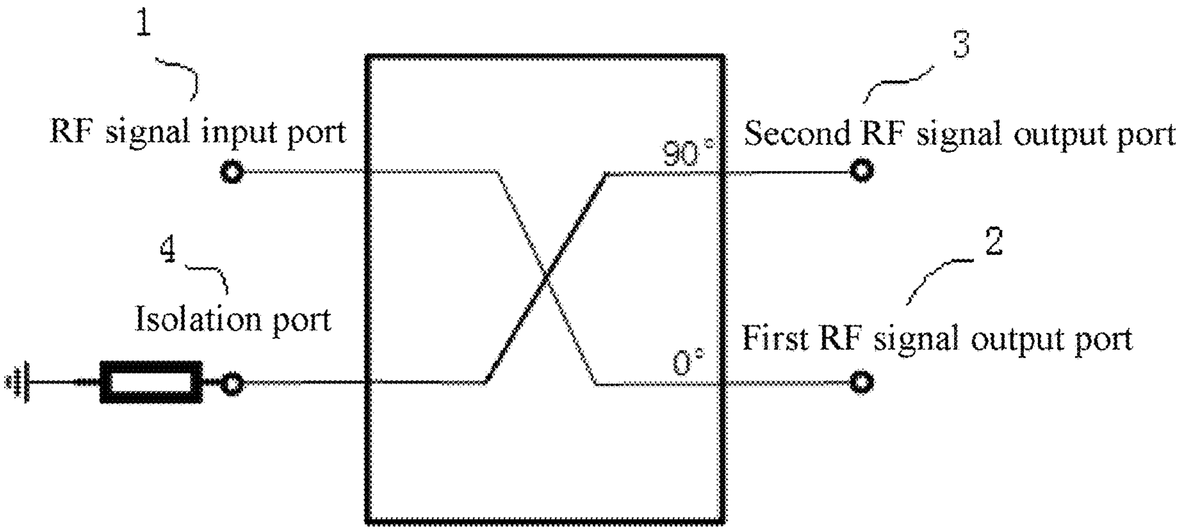
FIG. 1 is a schematic structural diagram of a 3 dB orthogonal hybrid coupler in the prior art.
Figure 2:
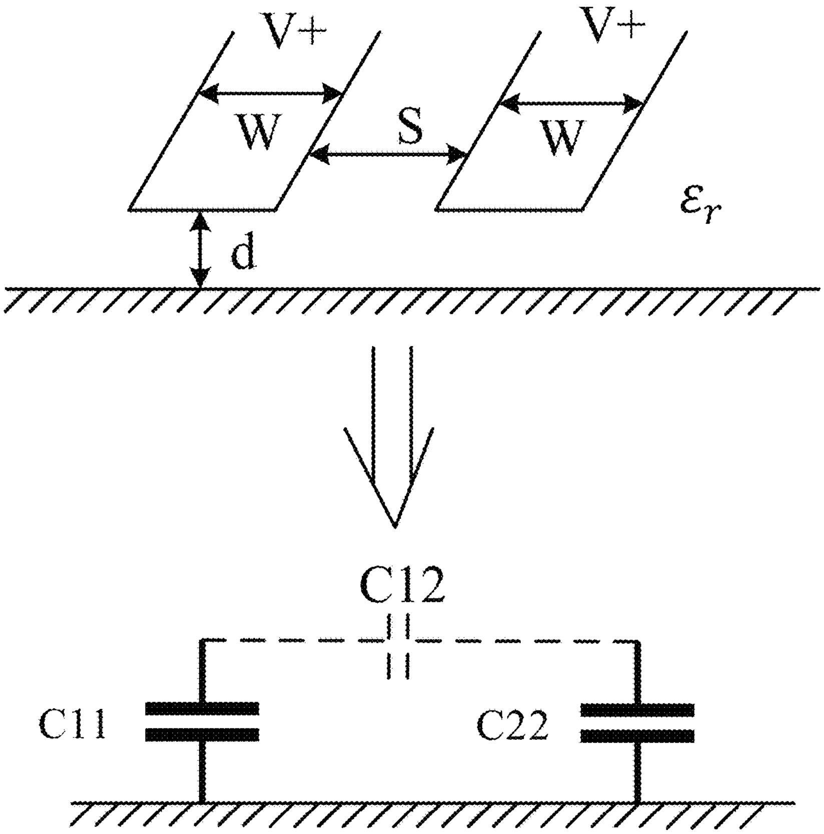
FIG. 2 shows a schematic structural diagram of a coupling line coupler and an even-mode capacitor equivalent circuit.
Figure 3:
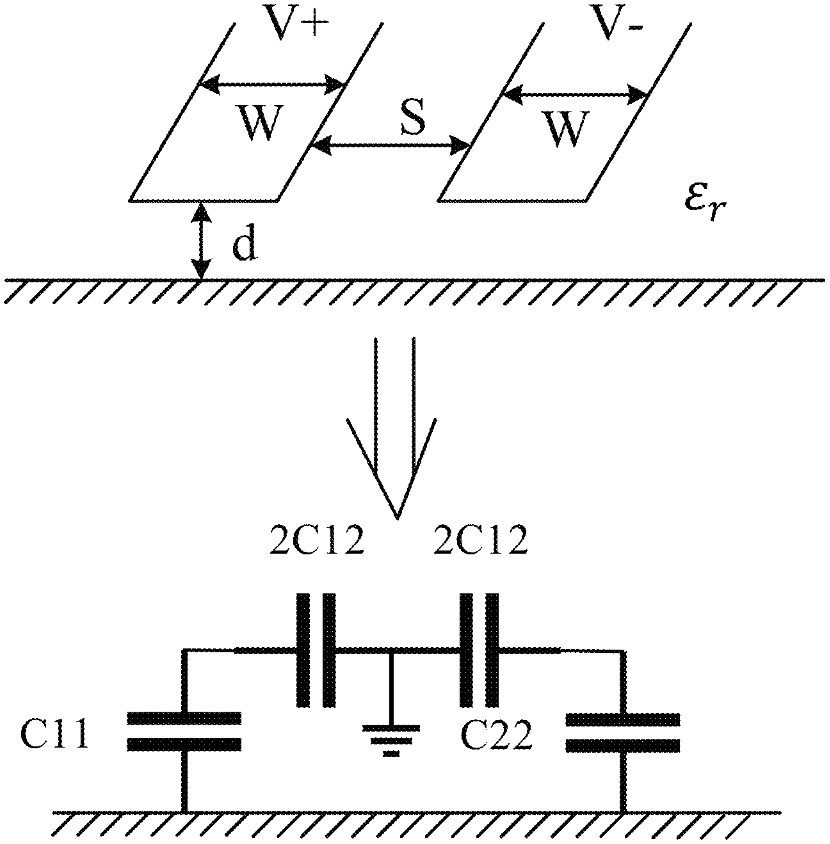
FIG. 3 shows a schematic structural diagram of a coupling line coupler and an odd-mode capacitor equivalent circuit.

The 3 dB orthogonal hybrid coupler is analyzed using a transverse electromagnetic mode (TEM). For an even mode and an odd mode, an electric field is in even symmetry about a central line, and there is no current flowing between two strip conductors. At this time, an exported equivalent circuit is as shown in FIG. 2 and FIG. 3. A voltage of the first RF signal output port 2 is:

$$V_2 = V_0\frac{j*C*\tan\theta}{\sqrt{1-C^2}+j*\tan\theta} \tag{1}$$

where $V_0$ is a voltage of the RF signal input port 1; j is an imaginary part; θ is a transmission line phase; and C is a coupling coefficient of the 3 dB orthogonal hybrid coupler.

A voltage of the second RF signal output port 3 is:

$$V_3 = V_0\frac{\sqrt{1-C^2}}{\sqrt{1-C^2}*\cos\theta+j*\sin\theta} \tag{2}$$

where $V_0$ is the voltage of the RF signal input port 1; j is an imaginary part of a phase; θ is the transmission line phase; and C is the coupling coefficient of the 3 dB orthogonal hybrid coupler. The coupling coefficient of the 3 dB orthogonal hybrid coupler is:

$$C = \frac{Z_{0e}-Z_{0o}}{Z_{0e}+Z_{0o}} \tag{3}$$

where $Z_{0e}$ is an even mode characteristic impedance of the 3 dB orthogonal hybrid coupler, and $Z_{0o}$ is an odd mode characteristic impedance of the 3 dB orthogonal hybrid coupler, which are respectively:

$$Z_{0e} = \frac{d}{2c\sqrt{\varepsilon_r}\,\varepsilon_0 W} \tag{4}$$

where d is a height to ground of the straight-in metal coil and the coupling metal coil; c is the velocity of light; $\varepsilon_r$ is a dielectric constant of a dielectric layer of the base plate; $\varepsilon_0$ is a standard dielectric constant; and W is a coil width of the straight-in metal coil and the coupling metal coil.

$$Z_{0o} = \frac{dS}{2c\sqrt{\varepsilon_r}\,\varepsilon_0 W(d+S)} \tag{5}$$

where d is the height to ground of the straight-in metal coil and the coupling metal coil; S is a spacing between the coils; c is the velocity of light; $\varepsilon_r$ is a dielectric constant of a dielectric layer of the base plate; $\varepsilon_0$ is a standard dielectric constant; and W is a coil width of the straight-in metal coil and the coupling metal coil.

The voltages of the two RF signal output ports of the 3 dB orthogonal hybrid coupler are the same, and a phase difference is 90°, so that according to the two conditions, there may:

$$\mathrm{mag}(V_2)=\mathrm{mag}(V_3)=\mathrm{mag}(V_0)/\sqrt{2} \quad (6)$$

Where, $\mathrm{mag}(V_2)$ is a voltage amplitude of the first RF signal output port 2; $\mathrm{mag}(V_3)$ is a voltage amplitude of the second RF signal output port 3; and $\mathrm{mag}(V_0)$ is a voltage amplitude of the RF signal input port 1.

$$\mathrm{phase}(V_3)-\mathrm{phase}(V_2)=\frac{\pi}{2} \quad (7)$$

where phase $(V_3)$ is a voltage phase of the second RF signal output port 3, and phase $(V_2)$ is a voltage phase of the first RF signal output port 2. The reference data for the design of the initial layout of the 3 dB orthogonal hybrid coupler is determined by means of the above-mentioned two conditions and in combination with formulas (1) to (7). The above-mentioned formulas are also applicable to the following coplanar structure.

As shown in FIG. 4, in order to facilitate the understanding of the 3 dB orthogonal hybrid coupler provided by this embodiment, the structure of the 3 dB orthogonal hybrid coupler is described in detail by taking the following as an example: the straight-in metal coils and the coupling metal coils adopt a 2 layers stacked structure. In the 3 dB orthogonal hybrid coupler, the first layer of metal coil of the base plate is a straight-in metal coil 111, and the second layer of metal coil of the base plate is a coupling metal coil 112. The straight-in metal coil 111 is connected between the RF signal input port 1 and the first RF signal output port 2, and the coupling alloy coil 112 is connected between the isolation port 4 and the second RF signal output port 3, and the isolation port 4 is connected with an isolation resistor to the ground. The base plate can be composed of a dielectric layer and a conductive layer. The base plate is a basic component used for a power amplifier, which is similar to a miniaturized printed circuit board and will not be described in detail here. In different embodiments of the present disclosure, the last layer of metal coil is a reference ground. The metal coil layer farthest away from the metal coil layer where the reference ground is located is defined as a first layer of straight-in metal coil, and the metal coil layers are ordered according to an order of the distances, from far to near, of the metal coil layers from the metal coil layer where the reference ground is located.

In an ideal case, when the RF signal input port 1 inputs an RF input signal, an induction coil formed by the straight-in metal coil 111 and an induction coil formed by the coupling metal coil 112 are used for electromagnetic coupling. The straight-in metal coil 111 and the coupling metal coil 112 are subjected to capacitive coupling by means of metal coil surfaces. One half of the RF input signal flows to the first RF signal output port 2, and the other half of the RF input signal is coupled to the second RF signal output port 3. A phase difference between two RF output signals is 90 degrees.

Embodiment 2

In the 3 dB orthogonal hybrid coupler provided by this embodiment, the straight-in metal coils and the coupling metal coils adopt the coplanar structure. The straight-in metal coil of each layer has a similar length, and the coupling metal coil of each layer has a similar length. The number of layers and the number of turns of the straight-in metal coils and the number of layers and the number of turns of the coupling metal coils are the same. A spacing between each turn of straight-in metal coil and each turn of coupling metal coil is the same. Furthermore, on the base plate, the straight-in metal coils and coupling metal coils of each layer with the same number of turns are staggered at equal spacing. The straight-in metal coils and the coupling metal coils between adjacent layers have the same positions. That is, on the base plate, for the straight-in metal coil and the coupling metal coil on the same layer, one turn of straight-in metal coil and one turn of coupling metal coil can be staggered, or one turn of coupling metal coil and one turn of straight-in metal coil are staggered. The various layers of straight-in metal coils are connected in parallel through third through holes, and the various layers of coupling metal coils are connected in parallel through fourth through holes.

The 3 dB orthogonal hybrid coupler provided in this embodiment is mainly designed for 3 dB orthogonal hybrid couplers which are not suitable for the stacked structure because of a small number of layers of metal coils, a short distance between the bottom layer of metal coil and the ground plane, or a large thickness difference in the metal coil layers in some base plate properties. The 3 dB orthogonal hybrid coupler provided by this embodiment is also realized on the base plate, which solves the problem that the design of the 3 dB orthogonal hybrid coupler on a chip requires a large chip area, thereby increasing the design cost of the RF front-end module.

In the 3 dB orthogonal hybrid coupler of the coplanar structure, the straight-in metal coil and the coupling metal coil have a thickness of 10 μm to 40 μm, which will cause that the 3 dB orthogonal hybrid coupler has a relatively high working frequency band, so that in practical applications, reference data for designing an initial layout of the 3 dB orthogonal hybrid coupler on the base plate is preliminarily determined according to a working frequency band and a characteristic impedance for an output port of the 3 dB orthogonal hybrid coupler in combination with formulas (1) to (7). The data is a coil width, height to ground, the number of layers, the number of turns and a spacing between coils of the straight-in metal coils and the coupling metal coils. After the initial layout of the 3 dB orthogonal hybrid coupler is designed on the base plate, the layout is input into simulation software to build a 3D electromagnetic simulation model. Then, whether the reference data for the designed initial layout of the 3 dB orthogonal hybrid coupler is accurate is verified, and the data referenced for the design of the layout of the 3 dB orthogonal hybrid coupler is adjusted according to a verification result; and new layouts of the 3 dB orthogonal hybrid coupler are continuously generated and input into the simulation software to build the 3D electromagnetic simulation model for verification until a metal wire characteristic impedance value and working frequency band output by the verification result realize that the working frequency band of the 3 dB orthogonal hybrid coupler is within a deigned frequency range as much as possible, so that the characteristic impedances of the first RF signal output port 2 and the second RF signal output port 3 are as consistent as possible, while making the impedances and isolation degrees of the various ports of the coupler meet design indicators.

As shown in FIG. 5 and FIG. 6, in order to facilitate the understanding of the 3 dB orthogonal hybrid coupler provided by this embodiment, the structure of the 3 dB orthogonal hybrid coupler is described in detail by taking the following as an example: the straight-in metal coils and the coupling metal coils respectively adopt single layer and 3 layers coplanar structures.

As shown in FIG. 5, in the 3 dB orthogonal hybrid coupler, the straight-in metal coil 141 and the coupling metal coil 142 on the base plate are staggered, and the number of turns of the straight-in metal coil 141 and the number of turns of the coupling metal coil 142 are 1.5 respectively. The straight-in metal coil 141 is connected between the RF signal input port 1 and the first RF signal output port 2, and the coupling metal coil 142 is connected between the isolation port 4 and the second RF signal output port 3. The isolation port 4 is connected with an isolation resistor to the ground.

Ideally, when the RF signal input port 1 inputs an RF input signal, an induction coil formed by the straight-in metal coil 141 and an induction coil formed by the coupling metal coil 142 are used for electromagnetic coupling. The straight-in metal coil 111 and the coupling metal coil 112 are subjected to capacitive coupling by means of metal coil edges. One half of the RF input signal flows to the first RF signal output port 2, and the other half of the RF input signal is coupled to the second RF signal output port 3. A phase difference between two RF output signals is 90 degrees.

As shown in FIG. 6, in the 3 dB orthogonal hybrid coupler, the straight-in metal coils 151 and the coupling metal coils 152 form a 3 layers coplanar structure on the base plate. The straight-in metal coil 151 and coupling metal coil 152 of each layer are staggered, and the number of turns of the straight-in metal coil 151 and the number of turns of the coupling metal coil 152 are 3.75 respectively. The 3 layers of straight-in metal coils are connected in parallel together through third through holes, and the 3 layers of coupling metal coils are connected in parallel together through fourth through holes. The 3 layers of straight-in metal coils and the 3 layers of coupling metal coils form the parallel coplanar structure, thus achieving transmission of signals with the same shape. The straight-in metal coil 151 is connected between the RF signal input port 1 and the first RF signal output port 2, and the coupling metal coil 152 is connected between the isolation port 4 and the second RF signal output port 3. The isolation port 4 is connected with an isolation resistor to the ground.

Embodiment 3

In the 3 dB orthogonal hybrid coupler provided by this embodiment, the straight-in metal coils and the coupling metal coils adopt a combined form of a stacked structure and a coplanar structure, which further optimizes the symmetry of impedance among the RF signal input port 1, the first RF signal output port 2 and the second RF signal output port 3 to improve the performance of the 3 dB orthogonal hybrid coupler, save the chip area occupied for the design of the 3 dB orthogonal hybrid coupler, and reduce the design cost of the RF front-end module.

The straight-in metal coil of each layer has a similar length, and the coupling metal coil of each layer has a similar length. The number of layers and the number of turns of the straight-in metal coils and the number of layers and the number of turns of the coupling metal coils are the same. Furthermore, on the base plate, the straight-in metal coils and coupling metal coils of each layer with the same number of turns are staggered at equal spacing. The straight-in metal coils and the coupling metal coils between adjacent layers have opposite positions. That is, on the base plate, for the straight-in metal coil and coupling metal coil located on the same layer, one turn of straight-in metal coil and one turn of coupling metal coil can be staggered, and at this time, for the straight-in metal coil and coupling metal coil of adjacent layers, one turn of coupling metal coil and one turn of straight-in metal coil can be staggered. Or, for the straight-in metal coil and coupling metal coil of the same layer, one turn of coupling metal coil and one turn of straight-in metal coil can be staggered, and at this time, for the straight-in metal coil and coupling metal coil of adjacent layers, one turn of straight-in metal coil and one turn of coupling metal coil can be staggered.

Specifically, when the number of layers of the straight-in metal coils and the number of layers of coupling metal coils are not less than 4, connection relationships for the straight-in metal coils and the coupling metal coils between the various layers are as follows: one end of the coupling metal coil located on the first layer is connected with the first RF signal output port 2 and is connected with one end of each of the coupling metal coils located on the odd layers through a fifth through hole respectively, and the other end of the coupling metal coil located on the first layer is connected with one end of each of the coupling metal coils located on the even layers and the other ends of the coupling metal coils located on the odd layers through a sixth through hole respectively; the other end of the coupling metal coil located on the second layer is connected with the other ends of the coupling metal coils located on the even layers through a seventh through hole respectively; and the other end of the coupling metal coil located on the last layer is also connected with the isolation port 4. One end of the straight-in metal coil located on the first layer is connected with the first RF signal output port 3, and is connected with one end of each of the straight-in metal coils located on the odd layers through an eighth through hole respectively; the other end of the straight-in metal coil located on the first layer is connected with one end of each of the straight-in metal coils located on the even layers and the other ends of the straight-in metal coils of the odd layers through a ninth through hole respectively; and the other end of the straight-in metal coil located on the second layer is connected with the RF signal input port 1, and is connected with the other ends of the straight-in metal coils located on the even layers through a tenth through hole. In different embodiments of the present disclosure, the last layer of metal coil is a reference ground. The metal coil layers farthest away from the metal coil layer where the reference ground is located are respectively defined as a first layer of straight-in metal coil and a first layer of coupling metal coil, and the metal coil layers are ordered according to an order of the distances, from far to near, of the metal coil layers from the metal coil layer where the reference ground is located.

In practical applications, reference data for designing an initial layout of the 3 dB orthogonal hybrid coupler on the base plate is preliminarily determined according to a working frequency band and a characteristic impedance for an output port of the 3 dB orthogonal hybrid coupler in combination with formulas (1) to (7). The data is a coil width, height to ground, the number of layers, the number of turns and a spacing between coils of the straight-in metal coils and the coupling metal coils. After the initial layout of the 3 dB orthogonal hybrid coupler is designed on the base plate, the layout is input into simulation software to build a 3D electromagnetic simulation model. Then, whether the reference data for the designed initial layout of the 3 dB orthogonal hybrid coupler is accurate is verified, and the data referenced for the design of the layout of the 3 dB orthogonal hybrid coupler is adjusted according to a verification result; and new layouts of the 3 dB orthogonal hybrid coupler are continuously generated and input into the simulation software to build the 3D electromagnetic simulation model for verification until a metal wire characteristic impedance value and working frequency band output by the verification result realize that the working frequency band of the 3 dB orthogonal hybrid coupler is within a deigned frequency range as much as possible, so that the characteristic impedances of the first RF signal output port 2 and the second RF signal output port 3 are as consistent as possible, while making the impedances and isolation degrees of the various ports of the coupler meet design indicators.

Figure 7:
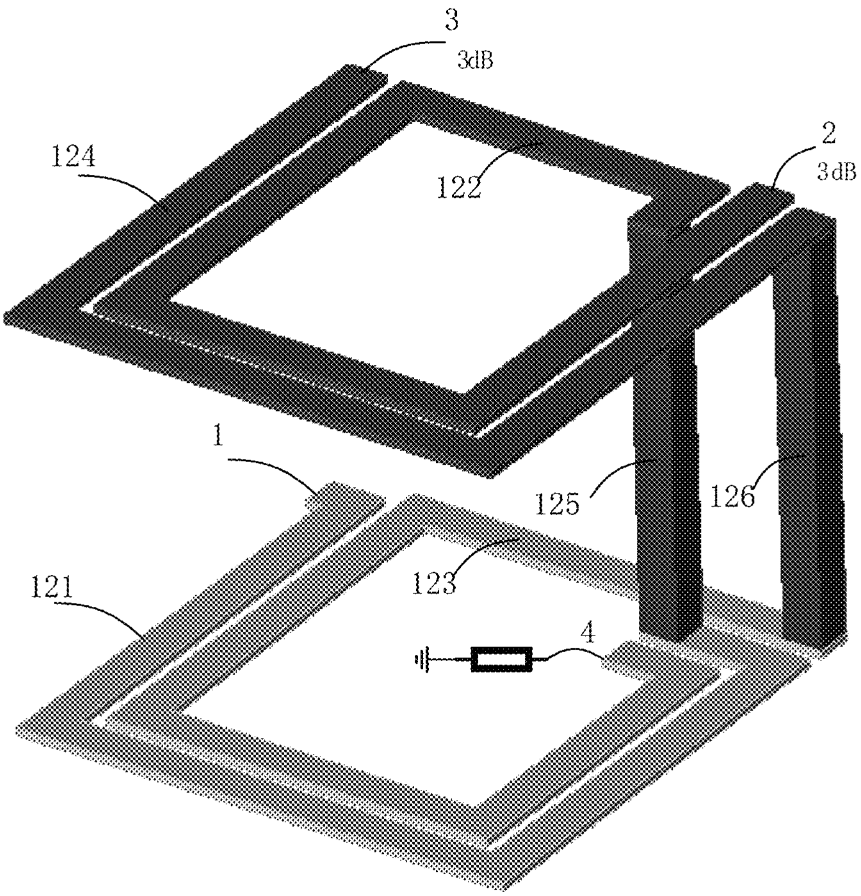
FIG. 7 is a schematic diagram of a stacked and coplanar hybrid structure of two layers of metal coils in a 3 dB orthogonal hybrid coupler provided by the present disclosure.
Figure 8:
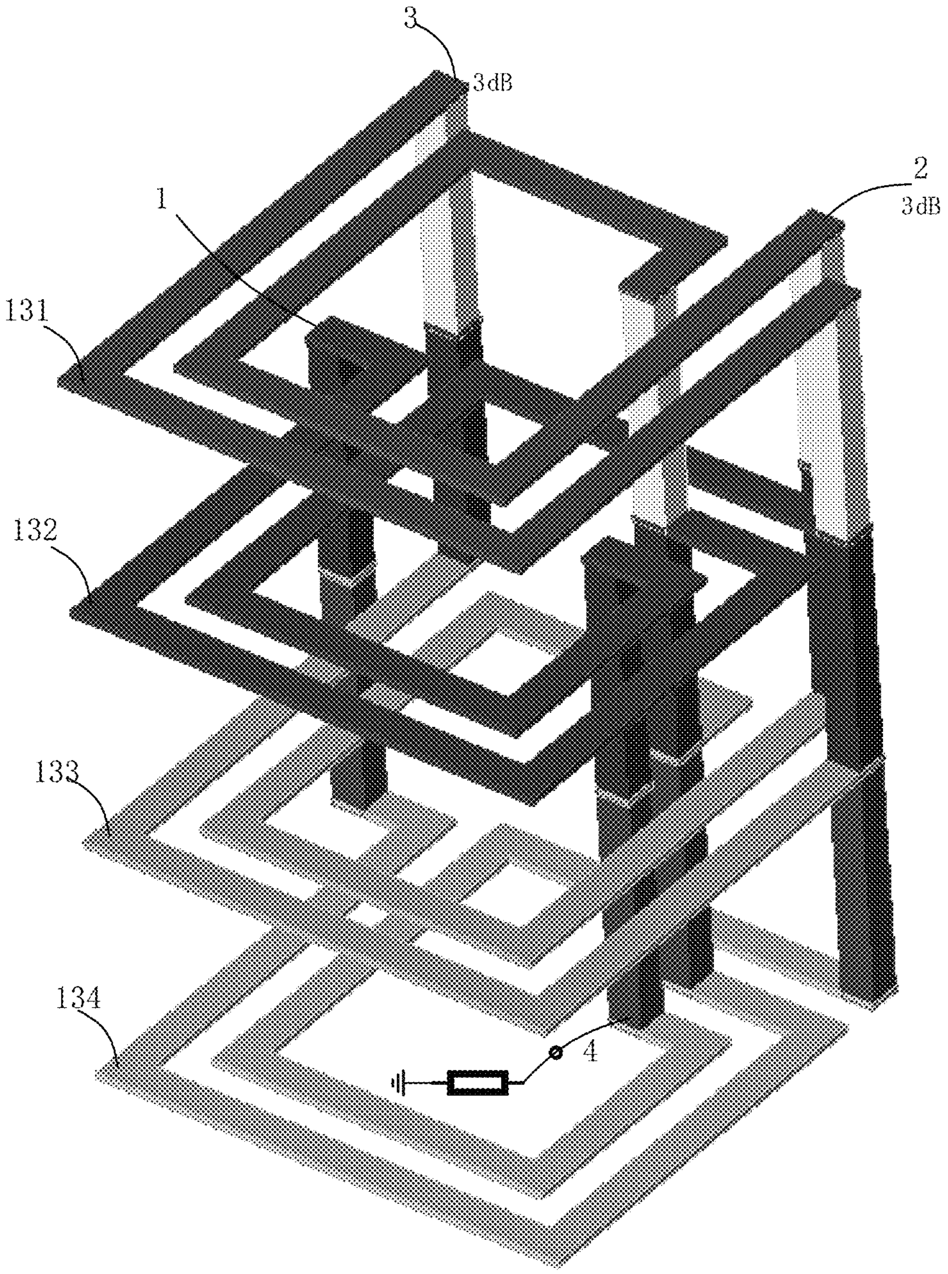
FIG. 8 is a schematic diagram of a stacked and coplanar hybrid structure of multiple layers of metal coils in a 3 dB orthogonal hybrid coupler provided by the present disclosure.

As shown in FIG. 7 and FIG. 8, in order to facilitate the understanding of the 3 dB orthogonal hybrid coupler provided by this embodiment, the structure of the 3 dB orthogonal hybrid coupler is described in detail by taking the following as an example: the straight-in metal coils and the coupling metal coils respectively adopt 2 layers and 4 layers stacked and coplanar combined structures.

As shown in FIG. 7, in the 3 dB orthogonal hybrid coupler, the number of turns of the straight-in metal coil and the number of turns of the coupling metal coil are 1.75 respectively. The straight-in metal coil 121 and the straight-in metal coil 122 are connected between the RF signal input port 1 and the first RF signal output port 2. The coupling metal coil 123 and the coupling metal coil 124 are connected between the isolation port 4 and the second RF signal output port 3. The through hole 125 is connected between the straight-in metal coil 121 and the straight-in metal coil 122, and the through hole 126 is connected between the coupling metal coil 123 and the coupling metal coil 124. The straight-in metal coil 121 and the coupling metal coil 123 form a coplanar structure, and the straight-in metal coil 121 and the coupling metal coil 124 form a stacked structure. The straight-in metal coil 122 and the coupling metal coil 123 form a stacked structure, and the straight-in metal coil 122 and the coupling metal coil 124 form a coplanar structure.

When the RF signal input port 1 inputs an RF input signal, an induction coil formed by the straight-in metal coil 121 and the straight-in metal coil 122 and an induction coil formed by the coupling metal coil 123 and the coupling metal coil 124 are used for electromagnetic coupling. The straight-in metal coil 121 and the coupling metal coil 123 are subjected to capacitive coupling through metal coil edges; the straight-in metal coil 121 and the coupling metal coil 124 are subjected to capacitive coupling through metal coil surfaces; the straight-in metal coil 122 and the coupling metal coil 123 are subjected to capacitive coupling through metal coil surfaces; the straight-in metal coil 122 and the coupling metal coil 124 are subjected to capacitive coupling through metal coil edges, so that one half of the RF input signal flows to the first RF signal output port 2, and the other half of the RF input signal is coupled to the second RF signal output port 3. A phase difference between two RF output signals is 90 degrees.

As shown in FIG. 8, in the 3 dB orthogonal hybrid coupler, the straight-in metal coils and coupling metal coils of each layer with the same number of turns are equally spaced in a staggered manner, and the straight-in metal coils and the coupling metal coils between adjacent layers have opposite positions.

For the 3 dB orthogonal hybrid coupler of the 4 layers stacked and coplanar combined structure, connection relationships of all the components are as follows: one end of the coupling metal coil 131 located on the first layer is connected with the second RF signal output port 3, and is connected with one end of the coupling metal coil 133 located on the 3$^{rd}$ layer through a fifth through hole, and the other end of the coupling metal coil 131 located on the first layer is respectively connected with one end of the coupling metal coil 132 located on the 2$^{nd}$ layer, one end of the coupling metal coil 134 located on the 4$^{th}$ layer and the other end of the coupling metal coil 133 located on the 3$^{rd}$ layer through a sixth through hole respectively; the other end of the coupling metal coil 132 located on the 2$^{nd}$ layer is connected with the other end of the coupling metal coil 134 located on the 4$^{th}$ layer through a seventh through hole; and the other end of the coupling metal coil 134 located on the 4$^{th}$ layer is also connected with the isolation port 4. One end of the straight-in metal coil located on the first layer is connected with the first RF signal output port 2, and is connected with one end of the straight-in metal coil located on the 3$^{rd}$ layer through an eighth through hole respectively; the other end of the straight-in metal coil located on the first layer is connected with one end of the straight-in metal coil located on the second layer and the other end of the straight-in metal coil of the second layer through a ninth through hole; and the other end of the straight-in metal coil located on the second layer is connected with the RF signal input port 1, and is connected with the other ends of the straight-in metal coils located on the even layers through a tenth through hole respectively.

The performance characteristics of the above-mentioned 3 dB orthogonal hybrid coupler will be further described below. From the above-mentioned formulas (1) to (5), three conclusions can be drawn: 1) A larger layer spacing of the stacked structure indicates a lower dielectric constant, a shorter distance from a metal layer to the ground plane and a lower coupling coefficient. 2) A thicker metal layer indicates a smaller inductance value and a larger area required for implementing the 3 dB orthogonal hybrid coupler. 3) A difference in parasitic parameters of the straight-in metal coil and the coupling metal coil will lead to a mismatch in the output voltage amplitude, phase and impedance of orthogonal ports of the 3 dB orthogonal hybrid coupler, which will reduce the overall performance.

In addition, parameters of a base plate material are greatly different from those of a chip material. To implement the 3 dB orthogonal hybrid coupler, three difficulties need to be overcome: The first difficulty is an extremely small coupling coefficient. The second difficulty is an extremely large area of the 3 dB orthogonal hybrid coupler. The third difficulty is a mismatch of the output voltage amplitude, phase and impedance of orthogonal ports caused by different parasitic parameters of the straight-in metal coil and the coupling metal coil. For this reason, in the embodiments shown in FIG. 7 and FIG. 8, the combined form of the stacked structure and the coplanar structure is adopted.

It should be noted that the combined form of the stacked structure and the coplanar structure does not adopt random staggered arrangement, but needs to follow three principles: first, maximizing the coupling coefficient; second, reducing the coupler area; and third, homogenizing the parasitic capacitance between the straight-in metal coil and the coupling metal coil and trying to make the parasitic capacitances from the straight-in metal coil and the coupling metal coil to the ground plane equal.

For this reason, the inventor proposes the structure of the 3 dB orthogonal hybrid coupler shown in FIG. 7 and FIG. 8 through multiple optimizations. In addition to the capacitive coupling of the upper and lower layers, the straight-in metal coil also uses the characteristic of the base plate that the metal layer is thicker to improve the coupling degree through side wall coupling. At the same time, the coupling coefficient is further increased by controlling a turns ratio and making magnetic fields of the straight-in metal coil and the coupling metal coil consistent in direction.

In addition, in the embodiments of the present disclosure, the metal layer and coil shape of the base plate material are used as much as possible to reduce the coupler area, but the metal layers close to the ground plane will bring a high parasitic capacitance and a great magnetic field leakage, so in the design, it is necessary to respectively optimize the frequency and the stacked structure of the base plate to ensure that the performance and area are met at the same time. By staggering each layer of metal coil, the parasitic capacitances between the straight-in metal coils and the coupling metal coils shall be homogenized as far as possible. By means of cross coupling of multiple layers of metals, the capacitances from the straight-in metal coils and the coupling metal coils to the ground are equal, so that the output voltage amplitude, phase and impedance of the orthogonal port are matched.

In one embodiment of the present disclosure, the thickness of the metal layer of the base plate material is about 14 μm-21 μm; the layer spacing of the stacked structure is about 25 μm-60 μm; the dielectric constant of the dielectric layer material is about 3; and the metal layer is about 40 μm-60 μm from the ground plane. An experiment shows that the structures of the 3 dB orthogonal hybrid coupler shown in FIG. 7 and FIG. 8 can achieve miniaturization in the base plate material and obtain optimal performance, and the convergence property and the product performance of the 3 dB orthogonal hybrid coupler are significantly better than those of a chip level design.

In the present disclosure, by use of the structure of the 3 dB orthogonal hybrid coupler shown in FIG. 8, a 3 dB orthogonal hybrid coupler with an n77 frequency band (3.3 GHz-4.2 GHz) is designed on a base plate with 6 layers of metals. FIG. 9 to FIG. 13 show electromagnetic simulation performance indicators of the 3 dB orthogonal hybrid coupler.

Figure 9:
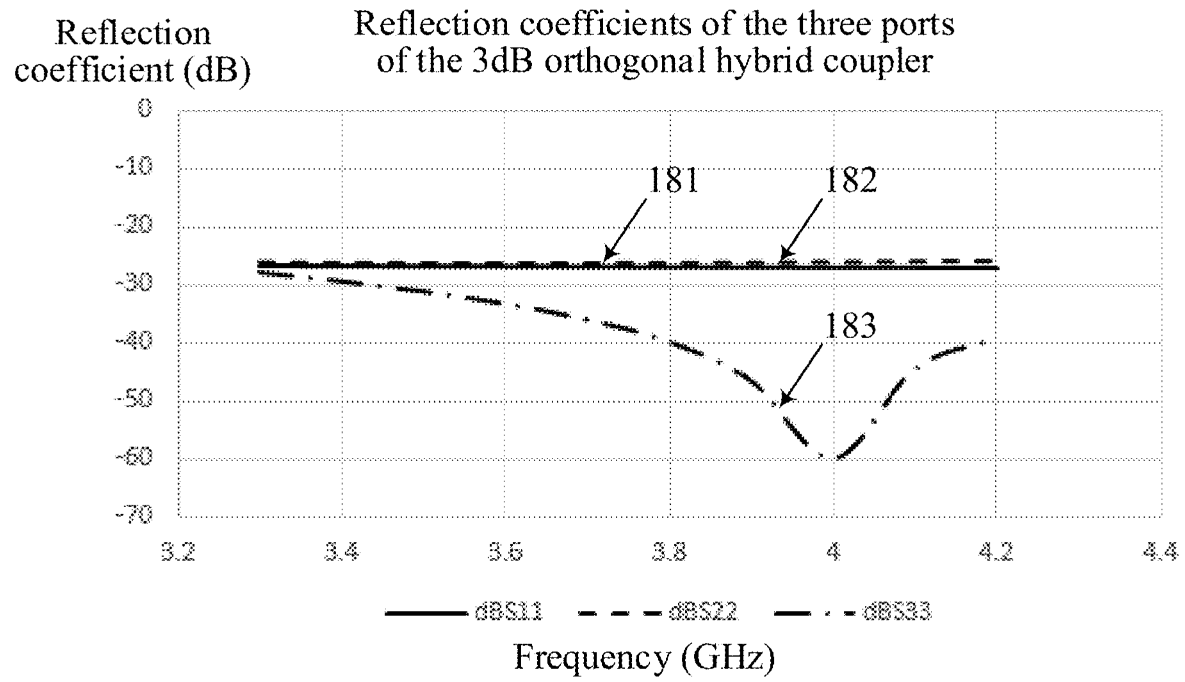
FIG. 9 is a schematic diagram of simulation results of emission coefficients of three ports in a 3 dB orthogonal hybrid coupler provided by the present disclosure.

FIG. 9 shows simulation results of reflection coefficients of three ports (the RF signal input port 1, the first RF signal output port 2 and the second RF signal output port 3) in a 3 dB orthogonal hybrid coupler provided by the present disclosure. The port impedance is 50 Ohm, and the reflection coefficients of the three ports are all less than −20 dBc. A smaller indicator value represents better port impedance matching. The 3 dB orthogonal hybrid coupler makes the RF front-end module have better performance. Moreover, the reflection coefficient of the 3 dB orthogonal hybrid coupler provided by the present disclosure is less than −20 dBc, which meets the system design indicator.

Figure 10:
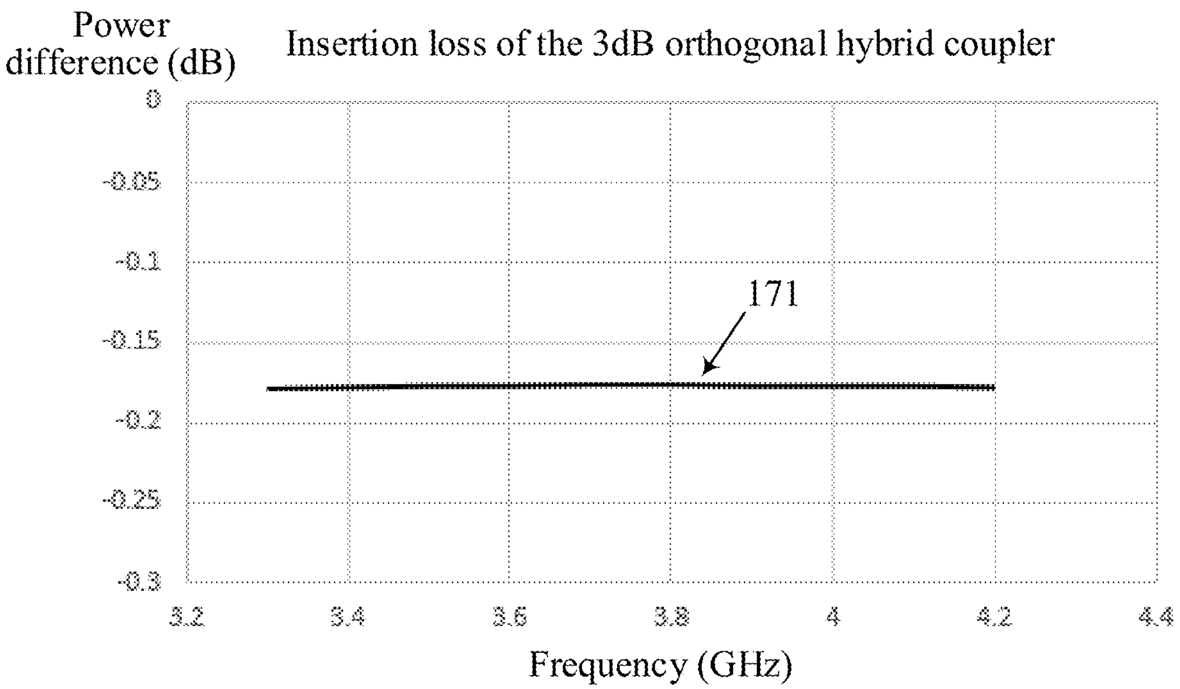
FIG. 10 is a schematic diagram of a simulation result of an insertion loss in a 3 dB orthogonal hybrid coupler provided by the present disclosure.

FIG. 10 shows a simulation result of an insertion loss of a 3 dB orthogonal hybrid coupler provided by the present disclosure. The insertion loss of a 3 dB orthogonal hybrid coupler traditionally designed and implemented in a chip is generally −0.5 dBc. Since the metal layers of the base plate are used to design the present disclosure, thanks to a larger metal wire width, a greater metal layer thickness and more metal layers, the insertion loss of the 3 dB orthogonal hybrid coupler is greater than −0.2 dBc in the whole working frequency band, which is 0.3 dBc greater than the design value of the 3 dB orthogonal hybrid coupler designed and implemented in the chip. The reflection coefficient of the 3 dB orthogonal hybrid coupler provided by the present disclosure is less than −15 dBc, which meets the system design indicator.

Figure 11:
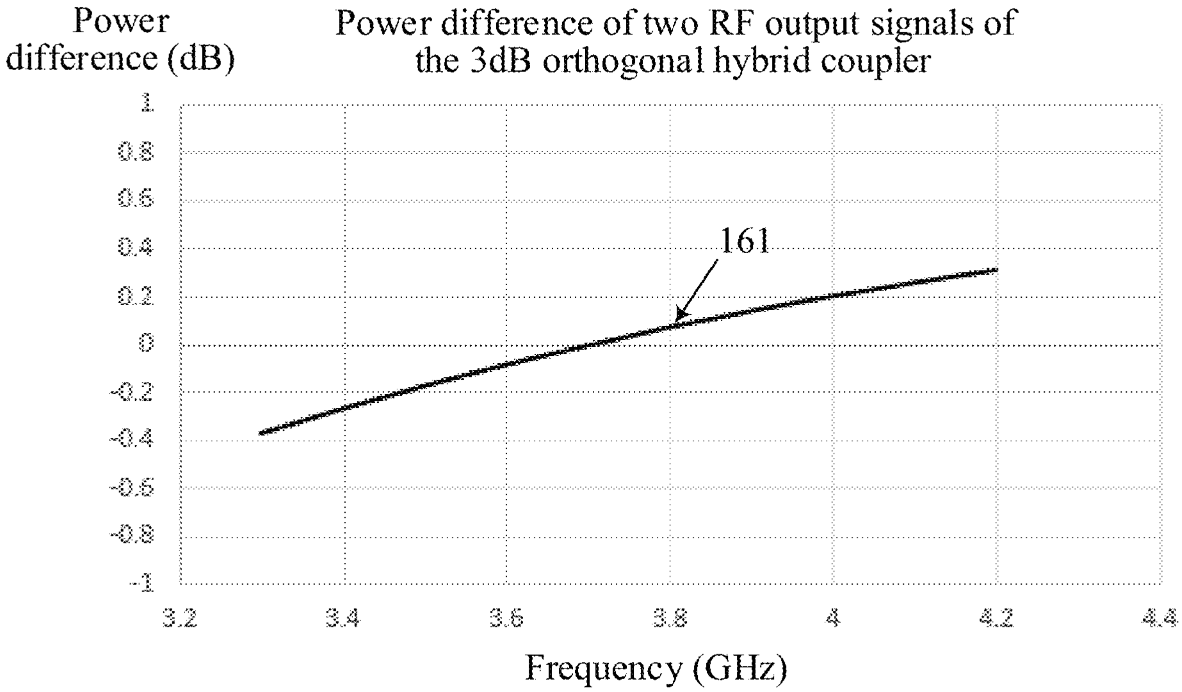
FIG. 11 is a schematic diagram of a simulation result of a power difference between two RF output signals in a 3 dB orthogonal hybrid coupler provided by the present disclosure.

FIG. 11 shows a simulation result of an output power difference between the first RF signal output port 2 and the second RF signal output port 3 of the 3 dB orthogonal hybrid coupler provided by the present disclosure. If the power difference between the two RF output signals is smaller, the symmetry of the two RF output signals is better. In the 3 dB orthogonal hybrid coupler provided by the present disclosure, an absolute value of the output power difference of the two RF signals is less than 0.4 dBc, which meets the system design indicator.

Figure 12:
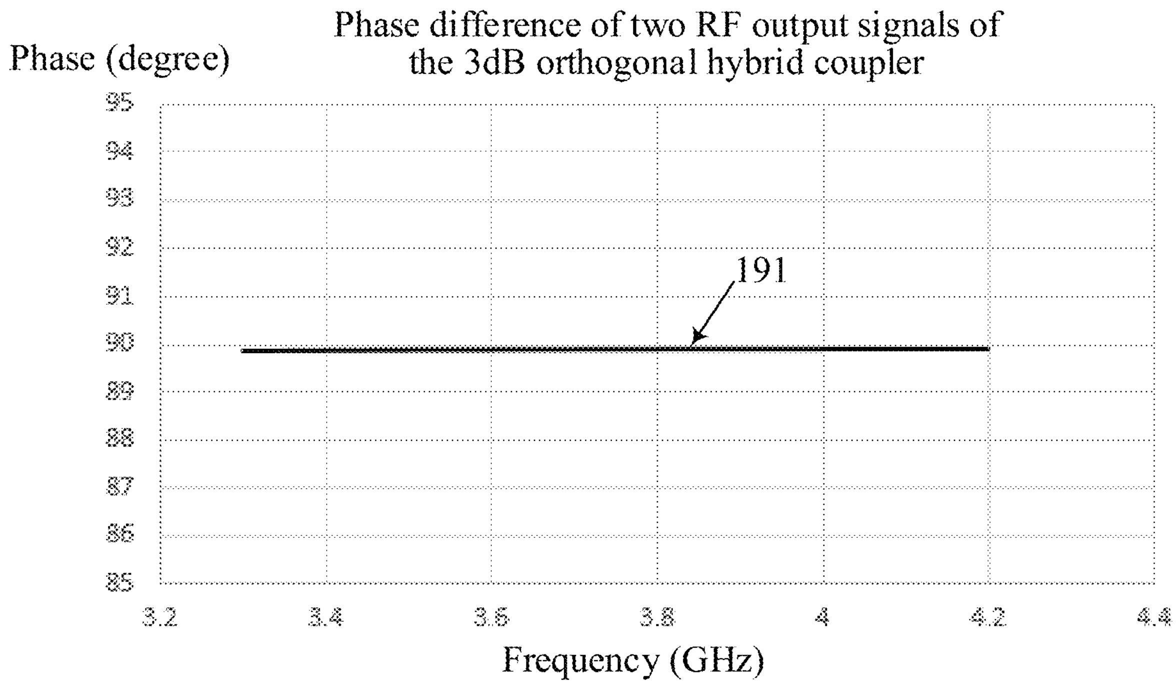
FIG. 12 is a schematic diagram of a simulation result of a phase difference between two RF output signals in a 3 dB orthogonal hybrid coupler provided by the present disclosure.

FIG. 12 shows a simulation result of a phase difference between the first RF signal output port 2 and the second RF signal output port 3 of the 3 dB orthogonal hybrid coupler provided by the present disclosure. If the phase difference between the two RF output signals is close to 90 degrees, the orthogonal property of the RF front-end module is better. In the 3 dB orthogonal hybrid coupler provided by the present disclosure, the phase difference between the two RF output signals is very close to 90 degrees, which meets the system design indicator.

Figure 13:
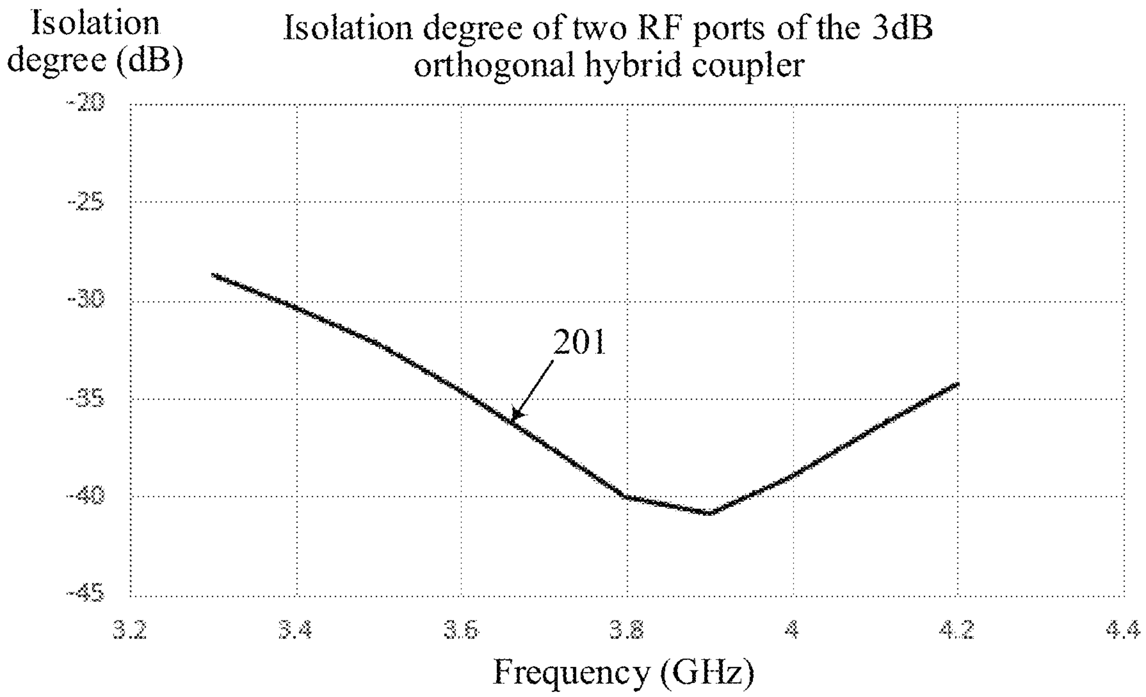
FIG. 13 is a schematic diagram of a simulation result of a port isolation degree of two RF output signals in a 3 dB orthogonal hybrid coupler provided by the present disclosure.

FIG. 13 shows a simulation result of an isolation degree between the first RF signal output port 2 and the second RF signal output port 3 of the 3 dB orthogonal hybrid coupler provided by the present disclosure. If the isolation degree between the two RF output ports is smaller, the impact of the emission energy of the two RF output ports on the performance of the RF front-end module is smaller. In the 3 dB orthogonal hybrid coupler provided by the present disclosure, the isolation degree between the two RF output ports is less than −20 dBc, which meets the system design indicator.

It can be seen from the simulation indicators in FIG. 9 to FIG. 13 that the 3 dB orthogonal hybrid coupler provided by the present disclosure can better optimize the insertion loss indicator. In addition, the port impedance emission coefficient, the port isolation degree, the RF output signal power difference, the phase difference and other indicators all meet the system design indicators, so that the objectives of optimizing the circuit performance, saving the chip area and reducing the cost of the RF front-end module are achieved.

The 3 dB orthogonal hybrid coupler provided by the present disclosure can be used in a variety of RF front-end modules. The RF front-end module includes an RF front-end receiving link, an RF front-end transmitting link, a balanced power amplifier structure and other existing conventional devices, which will not be described here.

In addition, the 3 dB orthogonal hybrid coupler provided by the present disclosure can also be used in a communication terminal as an important component of an RF integrated circuit. The communication terminals mentioned here refer to computer devices that can be used in a mobile environment and support GSM, EDGE, TD_SCDMA, TDD_LTE, FDD_LTE, 5G and other communication systems, including a mobile phone, a laptop, a tablet, an on-board computer, etc. In addition, the technical solutions provided by the present disclosure are also applicable to other RF integrated circuit applications, such as a communication base station.

The 3 dB orthogonal hybrid coupler provided by the present disclosure can be realized on the base plate. To this end, the straight-in metal coils and the coupling metal coils adopt a stacked structure, a coplanar structure or the combined form of a stacked structure and a coplanar structure, so that the corresponding RF signal input port is connected with the first RF signal output port, the isolation port and the second RF signal output port. The number of turns and the number of layers of the straight-in metal coils and the number of turns and the number of layers of the coupling metal coils are adjusted according to a working frequency and a port characteristic impedance of the 3 dB orthogonal hybrid coupler, so as to reduce an insertion loss of the coupler, and optimize the RF performance of the 3 dB orthogonal hybrid coupler such as the port reflection coefficient and the port isolation degree. By use of the present disclosure, the chip area can be effectively saved, and the design cost of the RF front-end module is reduced.

A 3 dB orthogonal hybrid coupler, a radio frequency (RF) front-end module and a communication terminal provided in the present disclosure are described in detail above. For those of ordinary skill in the art, any obvious change made to the present disclosure without departing from the essential content of the present disclosure shall fall within the protection scope of the patent of the present disclosure.

What is claimed is:

1. A 3 dB orthogonal hybrid coupler, arranged on a base plate, and comprising a radio frequency (RF) signal input port, a first RF signal output port, a second RF signal output port, an isolation port, a straight-in metal coils connected between the RF signal input port and the first RF signal output port, and a coupling metal coil connected between the isolation port and the second RF signal output port, wherein the isolation port is connected to an isolation resistor to the ground;

the straight-in metal coils and the coupling metal coils adopt a combined form of a stacked structure and a coplanar structure, wherein on the base plate, the straight-in metal coils and coupling metal coils of each layer with the same number of turns are equally spaced in a staggered manner, and the straight-in metal coils and the coupling metal coils between adjacent layers have opposite positions;

when the RF signal input port inputs an RF input signal, the straight-in metal coils and the coupling metal coils are coupled by means of electromagnetic coupling and capacitive coupling; one half of the RF input signal flows to the first RF signal output port, and the other half of the RF input signal is coupled to the second RF signal output port; and a phase difference between two RF output signals is 90 degrees.

2. The 3 dB orthogonal hybrid coupler according to claim 1, wherein when the straight-in metal coils and the coupling metal coils adopt a stacked structure, the straight-in metal coils and the coupling metal coils are subjected to capacitive coupling by means of metal coil surfaces.

3. The 3 dB orthogonal hybrid coupler according to claim 1, wherein when the straight-in metal coils and the coupling metal coils adopt a coplanar structure, the straight-in metal coils and the coupling metal coils are subjected to capacitive coupling by means of metal coil edges.

4. The 3 dB orthogonal hybrid coupler according to claim 1, wherein connection relationships for the straight-in metal coils and the coupling metal coils between the various layers are as follows:

one end of the coupling metal coil located on the first layer is connected with the second RF signal output port and is connected with one end of each of the coupling metal coils located on the odd layers through a fifth through hole respectively, and the other end of the coupling metal coil located on the first layer is connected with one end of each of the coupling metal coils located on the even layers and the other ends of the coupling metal coils located on the odd layers through a sixth through hole respectively; the other end of the coupling metal coil located on the second layer is connected with the other ends of the coupling metal coils located on the even layers through a seventh through hole respectively; the other end of the coupling metal coil located on the last layer is also connected with the isolation port;

one end of the straight-in metal coil located on the first layer is connected with the first RF signal output port, and is connected with one end of each of the straight-in metal coils located on the odd layers through an eighth through hole respectively; the other end of the straight-in metal coil located on the first layer is connected with one end of each of the straight-in metal coils located on the even layers and the other ends of the straight-in metal coils of the odd layers through a ninth through hole respectively; and the other end of the straight-in metal coil located on the second layer is connected with the RF signal input port, and is connected with the other ends of the straight-in metal coils located on the even layers through a tenth through hole respectively.

5. An RF front-end module, comprising the 3 dB orthogonal hybrid coupler according to claim 1.

6. A communication terminal, comprising the 3 dB orthogonal hybrid coupler according to claim 1.

* * * * *